United States Patent [19]
Söderlund

[11] Patent Number: 5,471,514
[45] Date of Patent: Nov. 28, 1995

[54] FUEL ELEMENT FOR A LIGHT-WATER NUCLEAR REACTOR

[75] Inventor: Anders Söderlund, Surahammar, Sweden

[73] Assignee: ABB Atom AB, Västerås, Sweden

[21] Appl. No.: 93,151

[22] Filed: Jul. 16, 1993

[30] Foreign Application Priority Data

Sep. 30, 1992 [SE] Sweden ................................ 9202828

[51] Int. Cl.⁶ ........................ G21C 3/32; G21C 19/20; G21C 15/00
[52] U.S. Cl. ........................ 376/313; 376/352; 376/443
[58] Field of Search ........................ 376/352, 364, 376/365, 446, 443, 175, 176, 313

[56] References Cited

U.S. PATENT DOCUMENTS

| | | | |
|---|---|---|---|
| 4,634,525 | 6/1987 | Yant | 376/313 |
| 5,030,412 | 7/1991 | Yates et al. | 376/352 |
| 5,066,453 | 11/1991 | Heppenstall et al. | 376/352 |
| 5,100,611 | 3/1992 | Nylund | 376/352 |
| 5,160,697 | 11/1992 | Verdier et al. | 376/352 |
| 5,219,517 | 6/1993 | Nylund | 376/352 |
| 5,225,152 | 7/1993 | Verdier | 376/352 |
| 5,230,861 | 7/1993 | Nylund | 376/352 |
| 5,282,231 | 1/1994 | Adams et al. | 376/352 |

FOREIGN PATENT DOCUMENTS

| | | | |
|---|---|---|---|
| 0162985 | 8/1985 | Japan | 376/352 |
| 3270515 | 11/1988 | Japan | 376/313 |
| 465644 | 10/1991 | Sweden | 376/352 |

*Primary Examiner*—Behrend E. Harvey
*Attorney, Agent, or Firm*—Watson, Cole, Grindle & Watson

[57] ABSTRACT

A fuel assembly for a light-water nuclear reactor includes a plurality of vertical fuel rods (12) which are arranged, in spaced relationship in the lateral direction, between a bottom tie plate (13) and a top tie plate (14). The bottom tie plate and the top tie plate are provided with through-holes (17a) for inlet and outlet of coolant for the fuel rods. Below the bottom tie plate, in the flow path of the water, a debris catcher (18) is arranged. The debris catcher includes at least one helical spring (19) which is fixed in a holder permeable to the coolant and defining at least one slot which is formed as a plane spiral (30) or several concentric annular slots (23, 27) in which slot/slots the helical spring/helical springs is/are arranged.

8 Claims, 3 Drawing Sheets

5,471,514

FUEL ELEMENT FOR A LIGHT-WATER NUCLEAR REACTOR

BACKGROUND OF THE INVENTION

The present invention relates to a fuel assembly for a nuclear reactor of light-water type, comprising a plurality of vertical fuel rods which are arranged, in spaced relationship, between a bottom tie plate and a top tie plate which are both provided with through-holes for inlet and outlet and for conducting coolant to the fuel rods.

Experience shows that, for example in connection with repairs and service of a nuclear reactor, debris may enter and then move with the water which circulates through the reactor core. The debris may, inter alia, consist of metal shavings (borings or turnings) formed in connection with the repair of, for example, a steam separator, pieces of metal wire, or other foreign particles, which have entered the system from the outside. The debris may give rise to abrasion damage, which may have serious consequences if it occurs on parts which are particularly easily damaged, such as fuel rods. This may be the case if the debris adheres to a spacer.

To avoid damage of the above-mentioned kind, it is known to form the bottom tie plates, already existing under fuel rod bundles, with a large number of bored holes in order for each bottom tie plate, besides its normal function, to function as a debris catcher in the form of a strainer and prevent debris from reaching the fuel rod bundle with control rod guide tubes and spacers.

A type of bottom tie plate which is also intended to serve as a debris catcher is described in Swedish patent application 9100402-8. This bottom tie plate is provided with horizontal channels which cross vertical flow channels, and in at least some of the horizontal channels spiral springs with horizontal symmetry axis are arranged. The disadvantage of this solution is that the flow resistance across the bottom tie plate becomes too high.

A type of separate debris catcher arranged below the bottom tie plate is described in Swedish patent 465 644. This debris catcher comprises several turns of a wound tape or several concentric rings with spacing elements arranged between the turns of the tape or the rings, which spacing elements maintain a mutual distance between the turns of the tape or the rings in the radial direction.

The problem with hitherto known separate debris catchers is that they provide an impermissibly high flow resistance and/or are complicated and expensive to manufacture.

SUMMARY OF THE INVENTION

According to the present invention, a debris catcher is arranged as a separate unit below or above, close to or spaced from, the bottom tie plate in the flow path of the water through a bundle of rods. The debris-catching elements of the debris catcher consist of one or more springs, preferably helical springs. The use of helical springs as debris-catching elements allows an area reduction which is small in cross section and hence a moderate speed variation of the coolant flow when passing through the debris filter.

The debris catcher also comprises a holder for fixing the spring/springs, which is permeable to the flow of cooling water to the fuel rod.

The holder may, for example, consist of two or more substantially parallel plates, in which at least one of the flat sides of the respective plate is formed with a plurality of concentric annular slots in such a way that when two plates are arranged with the slotted flat sides against each other, they form a parallelepiped with annular channels.

A number of springs, corresponding to the number of channels, are fixed in the channels between the plates. The springs are thus arranged in radial layers close to each other in spaced relationship and at one or more levels depending on how many plates are used.

In the axial direction the plates are provided with through-holes for the flow of cooling water through the fuel assembly.

The debris catcher is normally arranged at least substantially such that the symmetry axis of the springs is horizontal. In a boiling-water reactor, the debris catcher can be arranged spaced from the bottom tie plate.

In at least certain types of pressurized-water reactors, it may be necessary to allow the debris catcher to make contact with the underside of the bottom tie plate or to arrange it at a very small distance from the underside.

By designing the debris catcher in the manner described above, it may be given a very low flow resistance and hence constitute a minimal obstacle to the desired flow while at the same time the pins with intermediate springs are active during the debris catching.

One advantage with the invention is that the debris catcher can be inserted into fuel assemblies without necessitating any major modifications and without significantly influencing the flow resistance.

A debris catcher according to the invention is very simple to manufacture and very robust since it can be designed with few parts. This also means that the risk of small parts becoming detached in connection with the water flowing through is very small.

An additional advantage is that it is possible to supplement, in a simple manner, already existing fuel designs with a debris catcher.

BRIEF DESCRIPTION OF THE DRAWINGS

The invention will be explained in greater detail by describing a number of embodiments with reference to the accompanying drawings, wherein.

DESCRIPTION OF THE PREFERRED EMBODIMENTS

Figure 1:
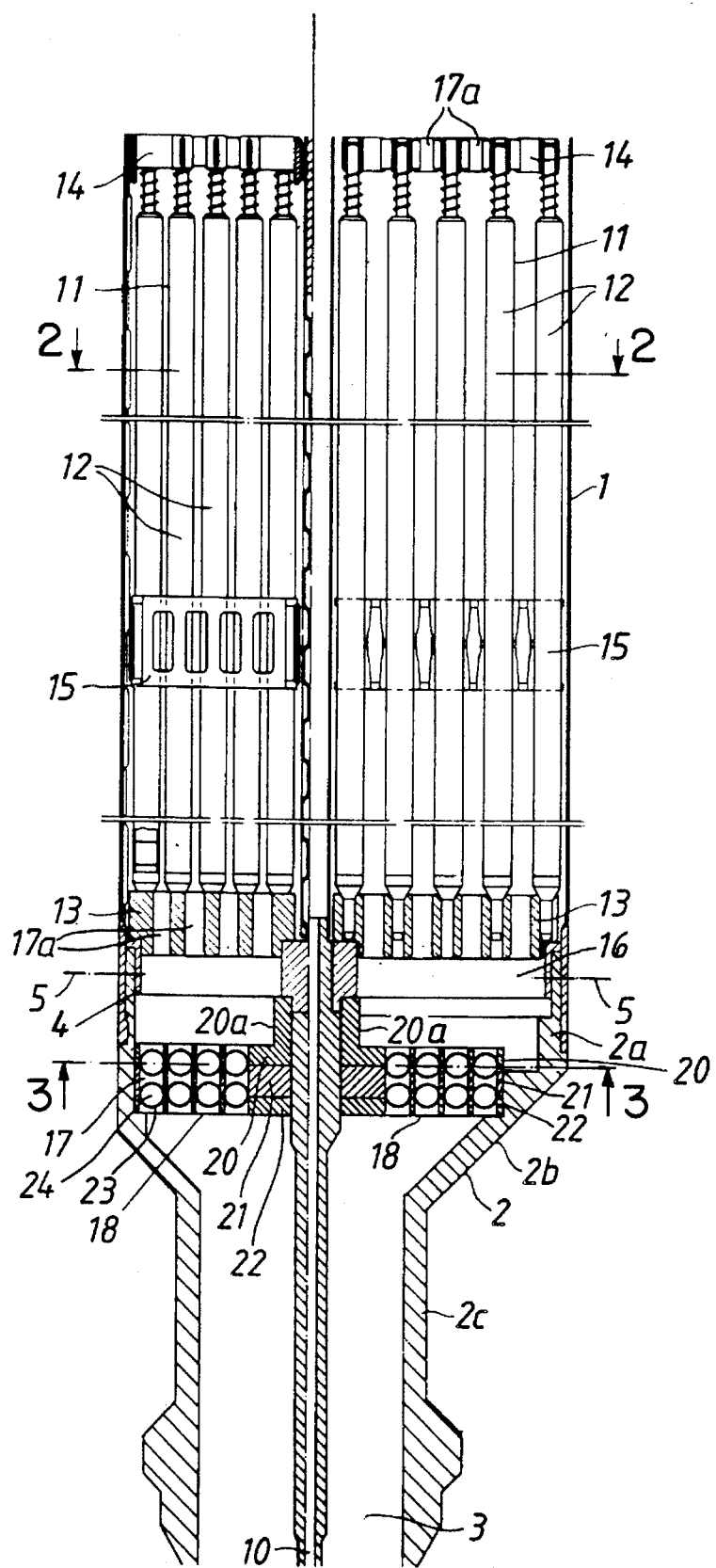
FIG. 1 shows, in a vertical section through the line 1—1 in FIG. 2, an embodiment of a composed fuel assembly composed of four rod bundles for a boiling-water reactor according to the invention with a debris catcher arranged below the bottom tie plate on each fuel assembly.
Figure 2:
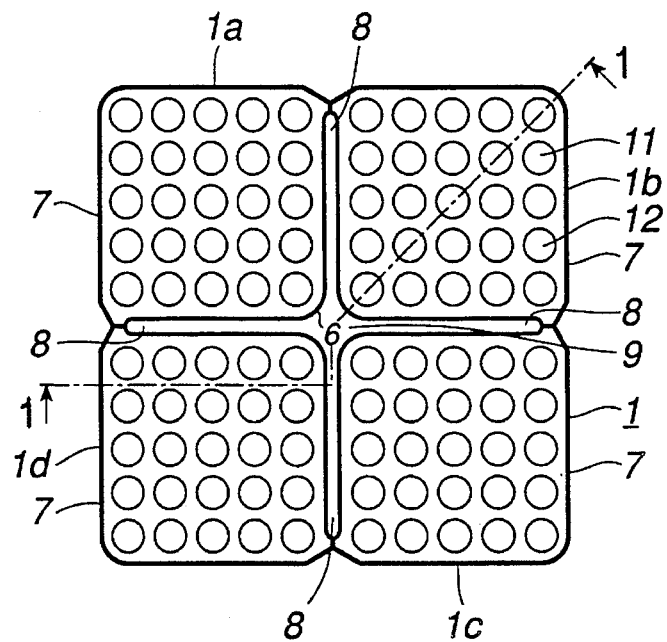
FIG. 2 shows a horizontal section through the line 2—2 in FIG. 1.
Figure 3:
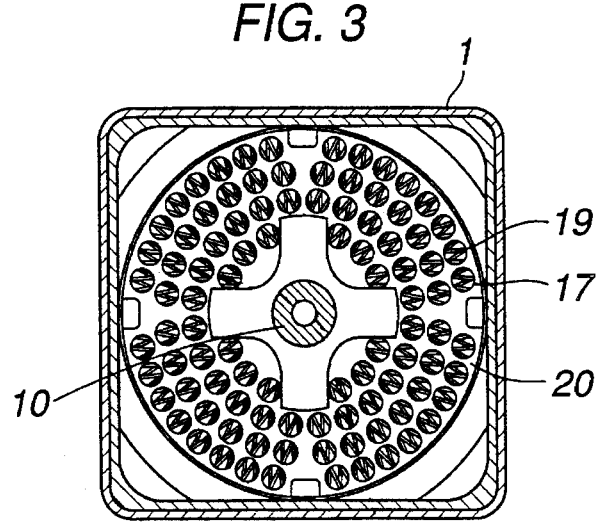
FIG. 3 shows in a view from above a debris catcher according to FIG. 1 arranged in the bottom part of a fuel assembly.
Figure 4:
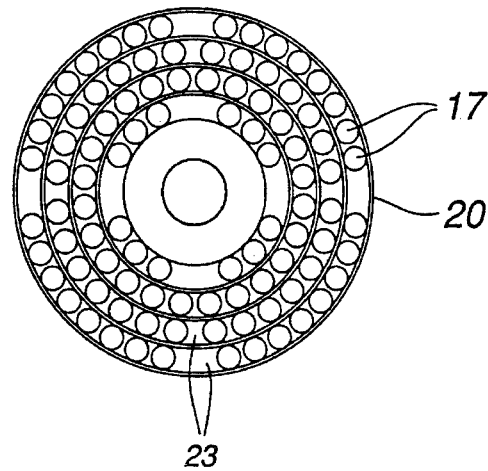
FIG. 4 shows a debris catcher according to FIG. 1 in a section 4—4 in FIG. 1 with the springs removed for the sake of clarity.

FIGS. 1–3 show a fuel channel 1 of substantially square cross section. The fuel channel 1 surrounds, with no significant free space, an upper square portion 2a of a bottom part 2 which otherwise comprises a conical portion 2b and a cylindrical portion 2c. The bottom part 2 has a downwardly-facing inlet opening 3 for cooling water. Besides supporting the fuel channel 1, the bottom part 2 supports a supporting plate 4. At its lowermost part, the fuel channel 1 has a relatively thick wall portion which is fixed to the bottom part 2 and the supporting plate 4 by means of a plurality of horizontal bolts, indicated by dash-dotted lines 5.

By means of a hollow supporting member 6 with cruciform cross section, the fuel channel 1 is divided into four vertical tubular parts 7 with at least substantially square cross section. The supporting member 6 is welded to the four walls 1a, 1b, 1c and 1d of the fuel channel 1 and has four hollow wings 8. The central channel formed by the supporting member 6 is designated 9 and is connected at the bottom to an inlet tube 10 for moderator water. Each tubular part 7 comprises a bundle 11 of twenty-five fuel rods 12. The rods 12 are arranged in a symmetrical lattice in five rows each containing five rods 12. Each rod 12 is included in two rows perpendicular to each other.

Each bundle 11 is arranged with a bottom tie plate 13, a top tie plate 14 and a plurality of spacers 15. A fuel rod bundle 11 with bottom tie plate 13, top tie plate 14, spacer 15 and fuel channel 1 forms a unit which, in this application, is referred to as a sub-assembly, whereas the device illustrated in FIGS. 1–3 and comprising four such sub-assemblies is referred to as a fuel assembly.

The four bottom tie plates 13 are supported in the fuel assembly by the supporting plate 4 and are each partially inserted into a corresponding square hole 16 therein.

The holes for the passage of the water through the bottom tie plate 13 are designated 17a.

According to the present invention, debris catchers 18 are arranged below the bottom tie plates 13 in the bottom part 2, that is, in the flow path for the water which flows to each one of the bottom tie plates 13.

An example of debris catchers 18 according to the invention is shown in FIG. 1 and FIGS. 3–5. The debris-catching element consists of a plurality of helical springs 19 arranged in slots in a holder.

In this embodiment the holder consists of three—a first 20, a second 21, and a third 22—substantially parallel plates where the two flat sides of the second plate 21 are provided with concentric, annular slots 23 whereas the first 20 and third 22 plates only have one flat side provided with such slots 23. Since the plates 20–22 are arranged with the flat sides adjoining each other, a parallelepiped is formed with annular channels 24 of circular cross section. The springs 19 are fixed in two levels between the plates 20–22 in these channels 24.

The plates 20–22 are provided in the axial direction with through-holes 17 for the flow of cooling water through the fuel assembly. The plate 20 is provided with a flange 20a for fixing the debris catcher 18 in the bottom part 2.

Figure 5:
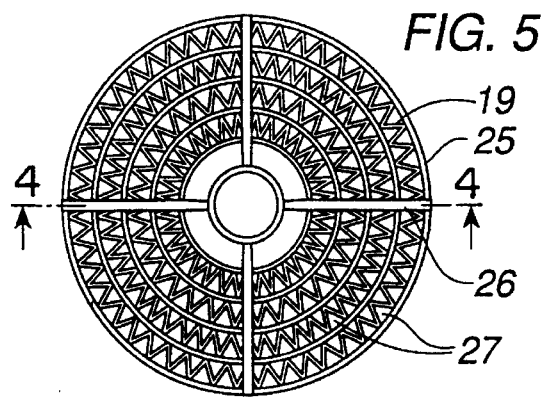
FIG. 5 shows in a view from above a debris catcher with the holder designed as a grid formed from concentric rings which are fixed to a cruciform support means and with helical springs arranged between the rings.
Figure 6:
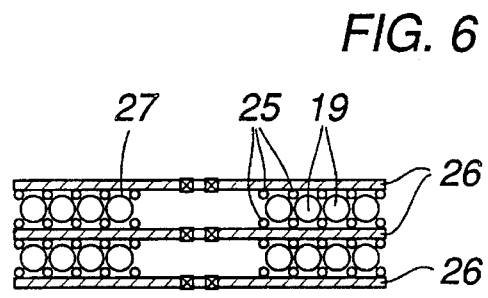
FIG. 6 shows a section 6—6 in FIG. 5.

FIGS. 5 and 6 show an alternative embodiment in which the holder consists of concentric rings 25 fixed to each other in the axial and radial directions via a cruciform support member 26, to which the rings are fixed, for example, by welding. In an alternative embodiment (not shown), the rings 25 can be fixed by means of pins which extend through holes in several rings 25, to which pins the rings 25 are welded.

The helical springs 19 are fixed between two layers of rings 25 in the spaces, slots 27, which are formed between the concentric rings 25.

Figure 7:
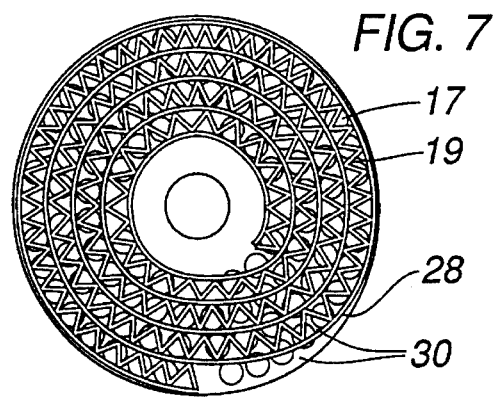
FIG. 7 shows, in a section corresponding to 4—4 in FIG. 1, a holder in the form of a plate with a plane spiral slot in which is arranged a plane spiral helical spring.
Figure 8:
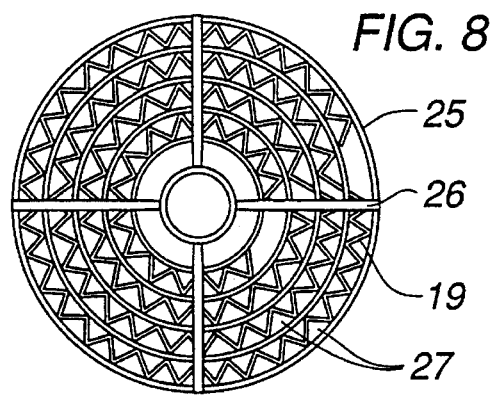
FIG. 8 shows a plane spiral helical spring arranged in a grid which consists of concentric rings which are fixed, by means of a cruciform support means, in the axial and radial directions.
Figure 9:
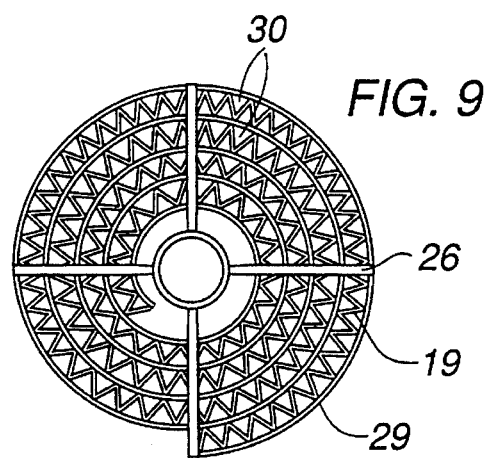
FIG. 9 shows a plane spiral helical spring fixed in a holder which consists of a plane spiral and which, by means of a cruciform support means, is fixed in the axial and radial directions.

FIGS. 7–9 show a debris-catching element which consists of one single helical spring 19 adapted so as to form, per se, a plane spiral.

FIG. 7 shows a holder seen in a section corresponding to 4—4 in FIG. 1. The holder comprises a plate 28 which is formed such that the slot 30 therein consists of a plane spiral corresponding to the plane spiral helical spring 19. In the axial direction the plate 28 is provided with through-holes 17 for the flow of cooling water through the fuel assembly.

FIG. 8 shows a holder for the plane spiral helical spring 19 seen from above. The holder is formed in the same way as the holder shown in FIG. 5. The plane spiral helical spring is fixed, like the annularly arranged helical springs in FIG. 5, in the space, the slot 27 between the concentric rings 25. At the transition of the spring 19 between two slots 27, the spring 19 is stretched out such that a part of a winding turn is arranged around the ring 25 which lies between the slots 27 in question.

FIG. 9 shows a holder which, like the plane spiral helical spring 19, is formed as a plane spiral 29. The spring 19 is arranged between the spiral turn of the plane spiral 29, that is, in the slot 30. The spiral is fixed radially and axially by means of a cruciform support member 26 corresponding to the support member shown in FIGS. 5, 6 and 8.

The material in the holders consists, for example, of stainless steel or another material resistant to corrosion by the reactor water. The material in the springs 19 preferably consists of Inconel. The pitch of the helical springs 19 is determined by the demand for debris catching capacity. The helical springs 19 are made with tolerances which prevent the occurrence of a play between the springs 19 and the holders, thus eliminating the risk of abrasion caused by vibrations.

To compensate for the pressure drop which arises across the debris catcher 18, the diameter of the through-holes 17a in the bottom plate 13 can be somewhat increased.

According to a particularly preferred embodiment of the invention, the debris catcher 18 consists of a device which is parallel to the bottom tie plate 13 such that the symmetry axis of the helical springs 19 is horizontal. If the debris catcher 18 is arranged below the bottom tie plate 13, it has, in addition to the above-mentioned advantages, the advantage of being able to be inspected and cleaned.

It is obvious that a debris catcher 18 of the kind described can be used in a fuel assembly which is not, as in the exemplified case, divided into sub-assemblies with separate bottom tie plates 13 but which consists of one single assembly with one single bottom tie plate 13 and is thus in analogous manner placed in the flow path of the water to the single bottom tie plate 13.

The number of levels with helical springs 19 can, of course, be greater or smaller than what has been shown in the embodiments.

It is also obvious that a debris catcher 18 of the kind described can be arranged below the bottom tie plate 13 of a pressurized-water reactor. In a pressurized-water reactor, because of the constructive design of the flow path of the water to the bottom tie plate, it is normally most suitable to allow the debris catcher 18 to make contact with the underside of the bottom tie plate.

I claim:

1. A fuel assembly for a light-water nuclear reactor comprising a bottom tie plate having through-holes therethrough, a top tie plate having through-holes therethrough, a plurality of vertical fuel rods extending between the bottom tie plate and the top tie plate, an inlet nozzle for directing coolant upwardly to said bottom tie plate so as to pass through said bottom tie plate, past said vertical fuel rods and through said top tie plate, said inlet nozzle defining a central vertical axis, and a debris catcher fixedly positioned within said inlet nozzle, said debris catcher comprising a support means for supporting at least one helical spring, said support means defining a channel which encircles said central vertical axis and extends in a first plane which is substantially perpendicular to said central vertical axis, and a helical spring fixedly positioned within said channel so as to extend in said first plane and trap debris in said coolant passing therethrough.

2. A fuel assembly according to claim 1, wherein said channel encircles said central vertical axis in the form of a spiral.

3. A fuel assembly according to claim 1, wherein said channel encircles said central vertical axis as an annulus.

4. A fuel assembly according to claim 3, wherein said support means defines a plurality of annular channels extending in said first plane.

5. A fuel assembly according to claim 4, including a plurality of helical springs respectively positioned in said plurality of annular channels.

6. A fuel assembly according to claim 1, wherein said support means defines a plurality of channels which encircle said central vertical axis and which extend in a plurality of parallel planes substantially perpendicular to said central vertical axis, and including a plurality of helical springs respectively positioned in said plurality of channels.

7. A fuel assembly according to claim 1, wherein said support means comprises two parallel plates which provide facing slots that define said channel.

8. A fuel assembly according to claim 1, wherein said support means comprises two spaced-apart, cruciform members that mount a plurality of rings therebetween that define said channel.

* * * * *